(12) United States Patent
Fröhlich

(10) Patent No.: US 10,618,184 B2
(45) Date of Patent: Apr. 14, 2020

(54) JOINT ARRANGEMENT HAVING AT LEAST ONE DRIVEN AXIS

(71) Applicant: Fraunhofer-Gesellschaft zur Förderung der angewandten Forschung e.V., München (DE)

(72) Inventor: Tim Fröhlich, Stuttgart (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 126 days.

(21) Appl. No.: 15/312,832

(22) PCT Filed: Apr. 2, 2015

(86) PCT No.: PCT/EP2015/057390
§ 371 (c)(1),
(2) Date: May 5, 2017

(87) PCT Pub. No.: WO2015/176865
PCT Pub. Date: Nov. 26, 2015

(65) Prior Publication Data
US 2017/0239819 A1 Aug. 24, 2017

(30) Foreign Application Priority Data
May 20, 2014 (DE) .......... 10 2014 107 071

(51) Int. Cl.
*B25J 17/00* (2006.01)
*B25J 19/00* (2006.01)
(Continued)

(52) U.S. Cl.
CPC .............. *B25J 17/00* (2013.01); *B25J 5/007* (2013.01); *B25J 18/007* (2013.01);
(Continued)

(58) Field of Classification Search
None
See application file for complete search history.

(56) References Cited

U.S. PATENT DOCUMENTS 4,960,040 A * 10/1990 Kamagai .................. B25J 9/06
138/28
5,966,991 A * 10/1999 Gosselin .............. F16M 11/123
248/661

(Continued)

FOREIGN PATENT DOCUMENTS

DE 37 90 743 T1 1/1989
DE 10 2004 002416 A1 10/2004
(Continued)

OTHER PUBLICATIONS

International Search Report and Written Opinion for corresponding Patent Application No. PCT/EP2015/057390 dated Sep. 17, 2015.

*Primary Examiner* — Victor L MacArthur
(74) *Attorney, Agent, or Firm* — Renner, Otto, Boisselle & Sklar, LLP

(57) ABSTRACT

A joint arrangement includes at least one driven axis for activating a movement of a component of a robot, wherein a first base element (15) receives a first rotary element (16) rotatable about a first axis of rotation (14). The first rotary element (16) receives a second axis of rotation (18) separate from the first axis of rotation (14) and about which a second rotary element (22) is pivotably mounted on the first rotary element (16). The second rotary element (22) has a third axis of rotation (25) separate from the second axis of rotation (18) and about which a second base element (26) is rotatable relative to the second rotary element (22). The first and second axes of rotation (14, 18) have a point of intersection (29) lying outside the joint arrangement (11) and have an axial offset (19) relative to one another.

20 Claims, 4 Drawing Sheets

Figure 1:
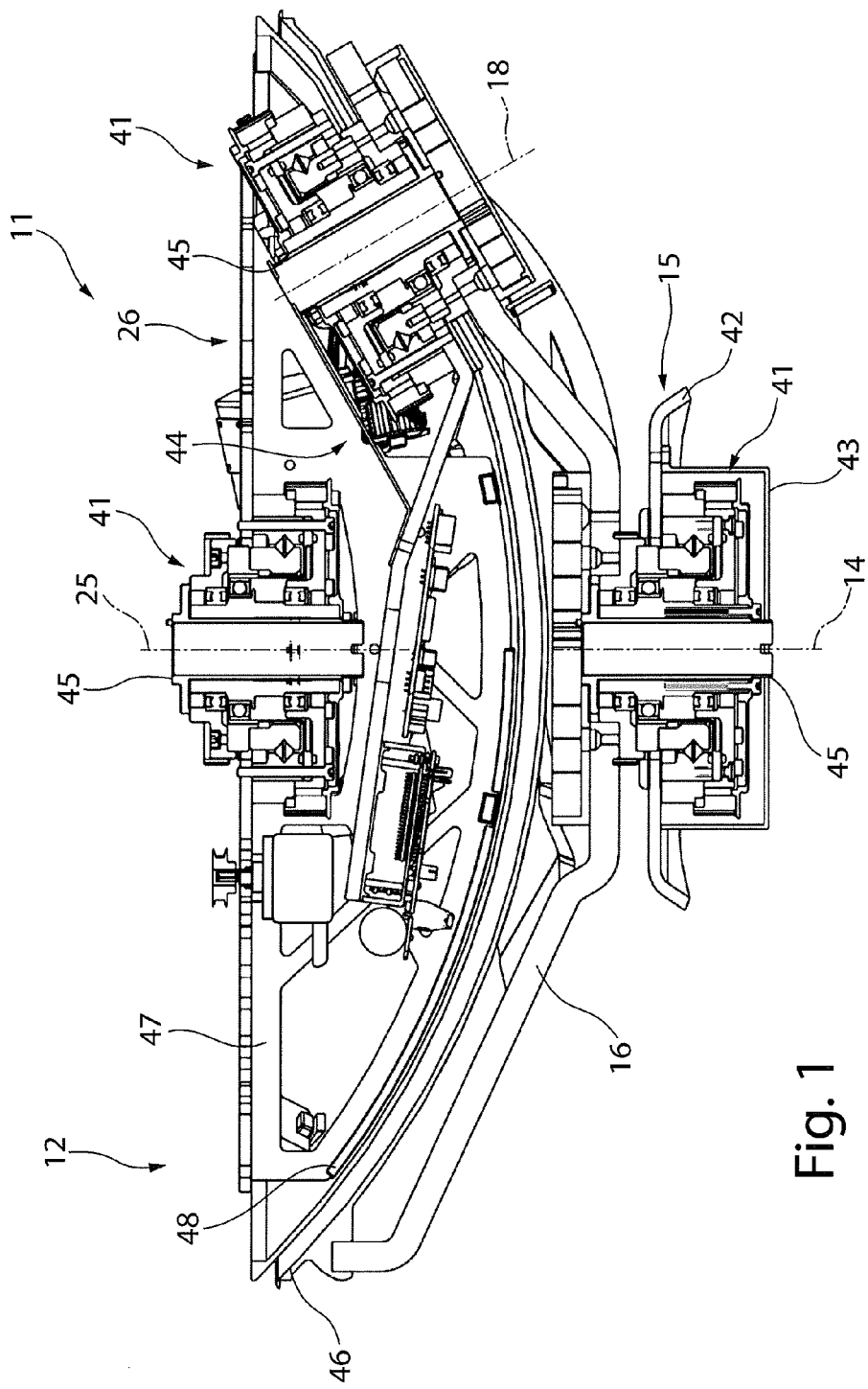

(51) Int. Cl.
  *B25J 18/00* (2006.01)
  *B25J 5/00* (2006.01)

(52) U.S. Cl.
  CPC .......... *B25J 19/0029* (2013.01); *Y10S 901/01* (2013.01); *Y10S 901/28* (2013.01)

(56) References Cited

U.S. PATENT DOCUMENTS

| | | | | |
|---|---|---|---|---|
| 6,024,576 | A * | 2/2000 | Bevirt | G05G 9/04 345/158 |
| 6,355,048 | B1 * | 3/2002 | Hong | A61B 90/50 606/107 |
| 6,786,727 | B2 * | 9/2004 | Irion | G09B 19/24 434/55 |
| 7,081,700 | B2 * | 7/2006 | Okumura | B25J 7/00 310/323.17 |
| 7,997,161 | B2 * | 8/2011 | Chablat | B23Q 1/5462 74/490.01 |
| 8,142,420 | B2 * | 3/2012 | Schena | A61B 34/70 606/1 |
| 8,162,926 | B2 * | 4/2012 | Schena | A61B 34/30 606/1 |
| 8,167,872 | B2 * | 5/2012 | Schena | A61B 34/70 606/1 |
| 8,167,873 | B2 * | 5/2012 | Schena | B25J 17/0266 606/1 |
| 8,303,575 | B2 * | 11/2012 | Rodriguez Y Baena | A61B 34/70 606/1 |
| 8,371,187 | B2 * | 2/2013 | Payandeh | B25J 13/02 74/469 |
| 8,469,945 | B2 * | 6/2013 | Schena | B25J 17/0258 606/1 |
| 8,506,556 | B2 * | 8/2013 | Schena | A61B 34/37 606/1 |
| 8,540,382 | B1 * | 9/2013 | Hultberg | G01S 3/7861 359/838 |
| 2004/0024387 | A1 * | 2/2004 | Payandeh | A61B 90/11 606/1 |
| 2004/0149064 | A1 | 8/2004 | Narita et al. | |
| 2004/0183404 | A1 * | 9/2004 | Okumura | B25J 7/00 310/328 |
| 2007/0173788 | A1 * | 7/2007 | Schena | A61B 34/37 606/1 |
| 2007/0173789 | A1 * | 7/2007 | Schena | A61B 34/70 606/1 |
| 2007/0173975 | A1 * | 7/2007 | Schena | A61B 34/70 700/245 |
| 2007/0173976 | A1 * | 7/2007 | Schena | B25J 17/0266 700/245 |
| 2007/0173977 | A1 * | 7/2007 | Schena | B25J 17/0258 700/263 |
| 2009/0041565 | A1 * | 2/2009 | Rodriguez Y Baena | A61B 34/70 414/431 |
| 2010/0037720 | A1 | 2/2010 | Rosheim | |
| 2013/0223597 | A1 * | 8/2013 | Graumann | A61B 6/4452 378/197 |
| 2013/0255425 | A1 * | 10/2013 | Schena | A61B 34/37 74/490.01 |
| 2013/0338434 | A1 * | 12/2013 | Schena | B25J 17/0258 600/102 |
| 2015/0105798 | A1 * | 4/2015 | Lohmeier | A61B 34/71 606/130 |

FOREIGN PATENT DOCUMENTS

| | | | |
|---|---|---|---|
| DE | 10 2013 205008 A1 | 4/2014 | |
| EP | 0 115 728 A1 | 8/1984 | |
| FR | 2 791 294 A1 | 9/2000 | |
| FR | 2791294 A1 * | 9/2000 | .............. B25J 9/102 |
| GB | 2 207 655 A | 2/1989 | |
| JP | 2005 014097 A | 1/2005 | |
| JP | 2009 279700 A | 12/2009 | |
| WO | WO 2011/105400 A1 | 9/2011 | |

* cited by examiner

JOINT ARRANGEMENT HAVING AT LEAST ONE DRIVEN AXIS

This application is a national phase of International Application No. PCT/EP2015/057390 filed Apr. 2, 2015, which claims priority to German Patent Application No. 10 2014 107 071.2 filed May 20, 2014, which are hereby incorporated herein by reference in their entirety.

The invention relates to a joint arrangement having at least one driven axis, in particular for activating a movement of a robot.

In robotics, more and more so-called mobile platforms or robots are being used. These must be adjusted to and constructed in different surroundings in terms of their movements and handling tasks. These robots have joints for carrying out handling tasks, by means of which joints grip elements, for example, are able to be moved with respect to a body element and a base. Usually, joints, such as pan-tilt units or linear inherent axes, are used. This is known for example from JP 2005 014097 A, DE 10 2004 002 416 A1 and DE 37 90 743 A1. However, these have the disadvantage that they cannot perform a natural, circular movement. Moreover, linear axes, for example, have the problem that, in a robot having an inclination of the superstructure relative to a plinth, a centre of gravity shift occurs as a result of linear axes. The inclination is thus limited in most cases, however this means that these robots are only able to be used to a limited extent for manipulations on the ground.

In addition, spherical joints are used, as is known from U.S. 2010/0037720 A1 and WO 2011/105 400 A1 for example, in order to fix these in the mount. By doing so, there is no advantage relating to the problem of the centre of gravity shift when an upper section bends forward relative to a plinth.

The object of the invention is to propose a joint arrangement which enables a reduced centre of gravity shift relative to a central axis of the joint arrangement.

This object is solved by a joint arrangement in which a first base element incorporates a first rotation element and the first rotation element is mounted for rotation about a first rotation axis, the first rotation element incorporates a second rotation axis separate from the first rotation element, about which a second rotation element is mounted for swivelling on the first rotation element. In addition, the second rotation element has a third rotation axis separate from the second rotation axis, about which a second base element is able to be rotated relative to the second rotation element. The second rotation axis has an axial offset to the first rotation axis and is inclined relative to the first rotation axis in such a way that the first and the second rotation axes have an intersection point which lies outside the joint arrangement. Thus, on activation of an inclining movement or a bending movement between the first and the second base element, the centre of gravity is shifted only slightly or not at all from the first or third rotation axis of the joint arrangement. An intersection point between the first and the second rotation axis is created by the axial offset between the first and the second rotation axis as well as the inclination of the second rotation axis relative to the first rotation axis, said intersection point lying outside the joint arrangement. Thus, the region in which a system centre of gravity can move intrinsically stably increases.

In this embodiment according to the invention, based on the first base element, the maximum inclination is caused by the rotatable arrangement of the first rotation element about the first rotation axis and of the second rotation element about the second rotation axis, wherein the rotation about the third rotation axis serves only to align the further construction on the second base element. Thus, an inclination is introduced, in which, because of the axial offset caused by a tilting movement in one direction, a centre of gravity shift takes place in the other direction and thus a compensation by the sum of the axial offsets between the first and second axes is created.

A work space is preferably formed by the rotatable arrangement of the second rotation element relative to the first rotation element, the rotation movement of the first and second rotation element lying within said work space and the intersection point of the rotation axes of the first and second rotation element lying outside of this work space. Also, because of this stipulation, the centre of gravity of the second base element or of a superstructure arranged thereon can be shifted only slightly or not at all, relative to the first rotation element of the joint arrangement.

According to a preferable embodiment of the invention, it is provided that a further axial offset between the second rotation axis and the third rotation axis is smaller or larger than the axial offset between the first and the second rotation axis. Preferably, the respective inclination angle is the same. In this case, the third rotation axis is aligned parallel to the first rotation axis. Such an embodiment also enables a reduced centre of gravity shift.

Alternatively, it can be provided that a further axial offset between the second rotation axis and the third rotation axis corresponds to the axial offset between the first and the second rotation axis. Preferably, the respective inclination angle is also the same. In this case, the third rotation axis is aligned collinearly to the first rotation axis. This enables a further optimisation for a slight shift of the centre of gravity from the middle point when activating the inclining or bending movement.

The second rotation axis is preferably inclined relative to the first rotation axis at an inclination angle of 50°, in particular of 30° or less. Thus, on the one hand, a high stability can be achieved and, on the other hand, manipulations on the ground can be carried out by such a robot. The maximum inclination of the joint thereby corresponds to the sum of the inclination angles between the rotation axes.

The first rotation element is preferably formed as a pan body and the second rotation element as a sphere segment body, which are each connected to a base element. Thus, not only is a stable arrangement created but this also enables the second rotation element to be able to be moved along a sphere surface in the scope of the axial offset between the second and the third rotation axis. A radius of the sphere segment body is preferably adjusted to the radius of the pan body. In particular, this is adjusted to such an extent that there is a small gap between the sphere segment body and the pan body such that the sphere segment body is mounted to be able to be freely pivoted about the second rotation axis relative to the pan body.

Each rotation axis is driven by a separate motor for activating the joint arrangement. In this way, an individual activation and alignment of the second base element relative to the first base element or vice versa can take place.

For each rotation axis, a rotation movement from a zero position about an angle of +/−360° or fewer is preferably able to be activated. In doing so, a maximum flexibility and alignment in the space is obtained.

Alternatively, it can be provided that abrasive rings AB are provided for the rotation movement of the rotation elements in the rotation axes, said abrasive rings AB enabling an infinite rotatability of the rotation elements and/or base elements.

The respective rotation position of the rotation elements with respect to one another or to the base elements is recorded by means of a sensor, in particular an absolute value transmitter. Thus recognising the positioning for activating the joint arrangement is possible, even in the event of a power cut. Based on a starting position, the respectively adopted inclining position can be recognised such that activation back to a starting position is possible.

The first and the second base element are preferably formed as a base plate or a connecting flange. A flexible adjustment to different assembly situations and assembly positions is thus enabled.

The rotation axes are preferably formed as hollow axes such that a cable bushing is possible in order to supply the further drives for the rotation axes, starting from the first base element for example, which is connected fixedly to a plinth element. In addition, a superstructure is preferably provided on the second base element, and a centre of gravity of the superstructure lies in the intersection point of the first and second rotation axes. A particularly tilt-proof arrangement is created by such an embodiment.

According to a first alternative embodiment, the first base element is formed as a mounting plate and comprises a motor which drives the first rotation element that is mounted for rotation by a bearing relative to the mounting plate. Thus the joint arrangement is easily able to be mounted to many base frames, substructures or the like such that on this basis, for example, the corresponding handling can be achieved by a superstructure arranged on the second base element.

Alternatively, the first base element can be formed as a mobile platform on which the first rotation element is fixedly arranged. The mobile platform can be driven for rotation about its own axis such that this rotation axis forms the rotation axis of the first rotation element at the same time.

In addition, the mobile platform preferably has a chassis which is driven moveably by a motor and incorporates accumulators for the motors of the rotation axis of the rotation elements and base elements and the motor of the chassis.

Figure 2:
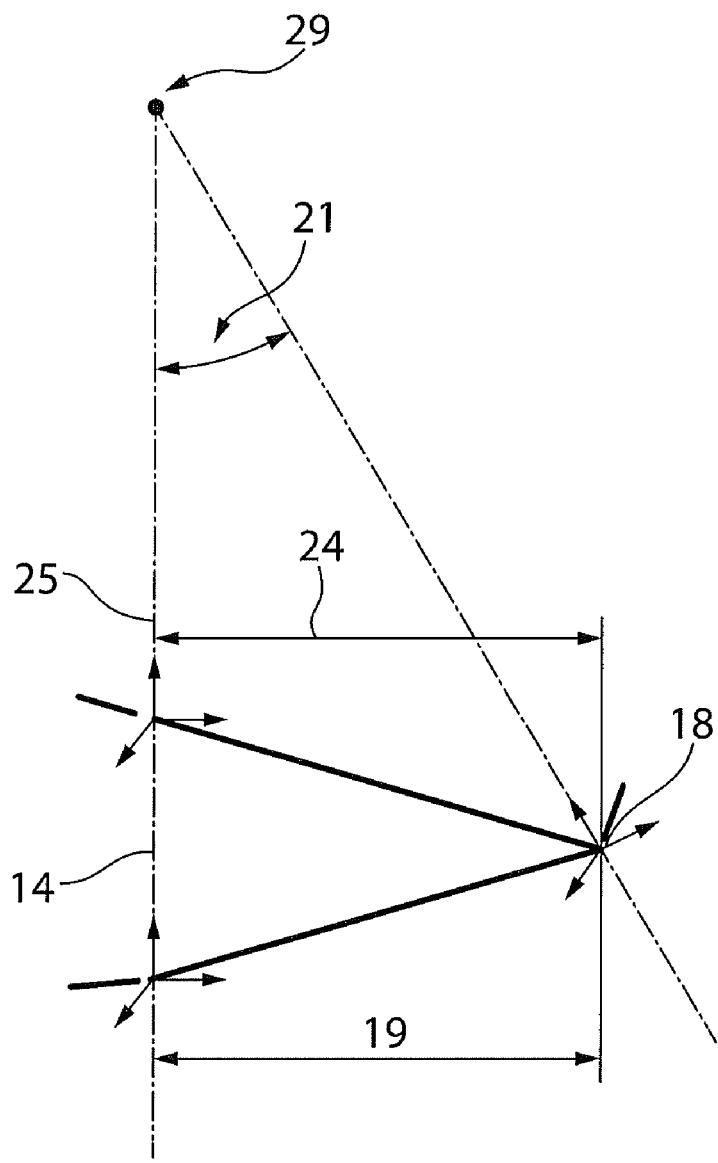
Figure 3:
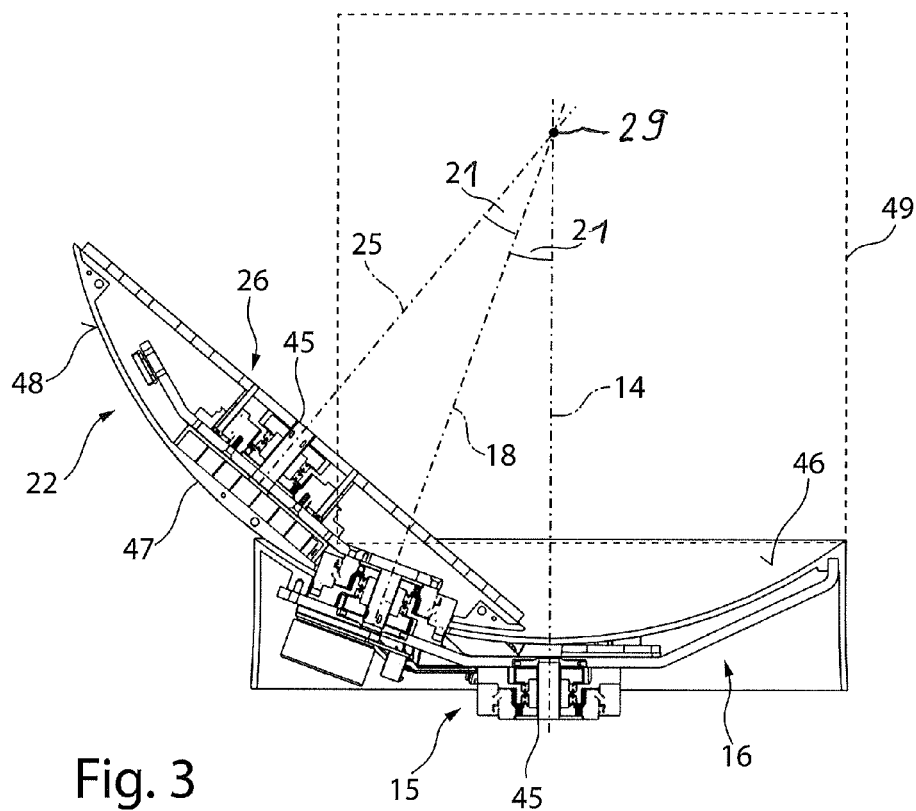
Figure 4A:
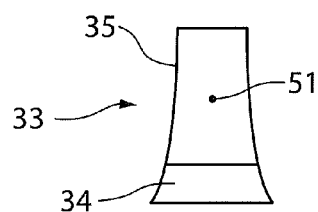
Figure 4B:
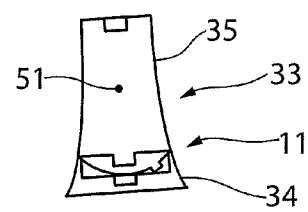
Figure 5A:
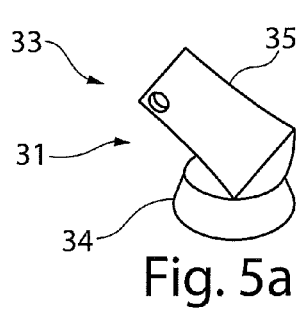
Figure 5B:
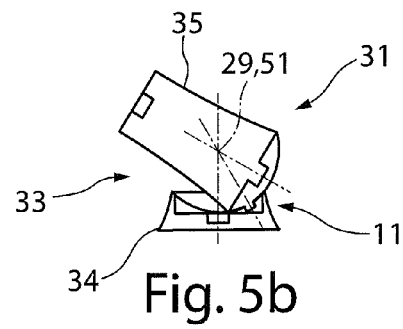
Figure 6:
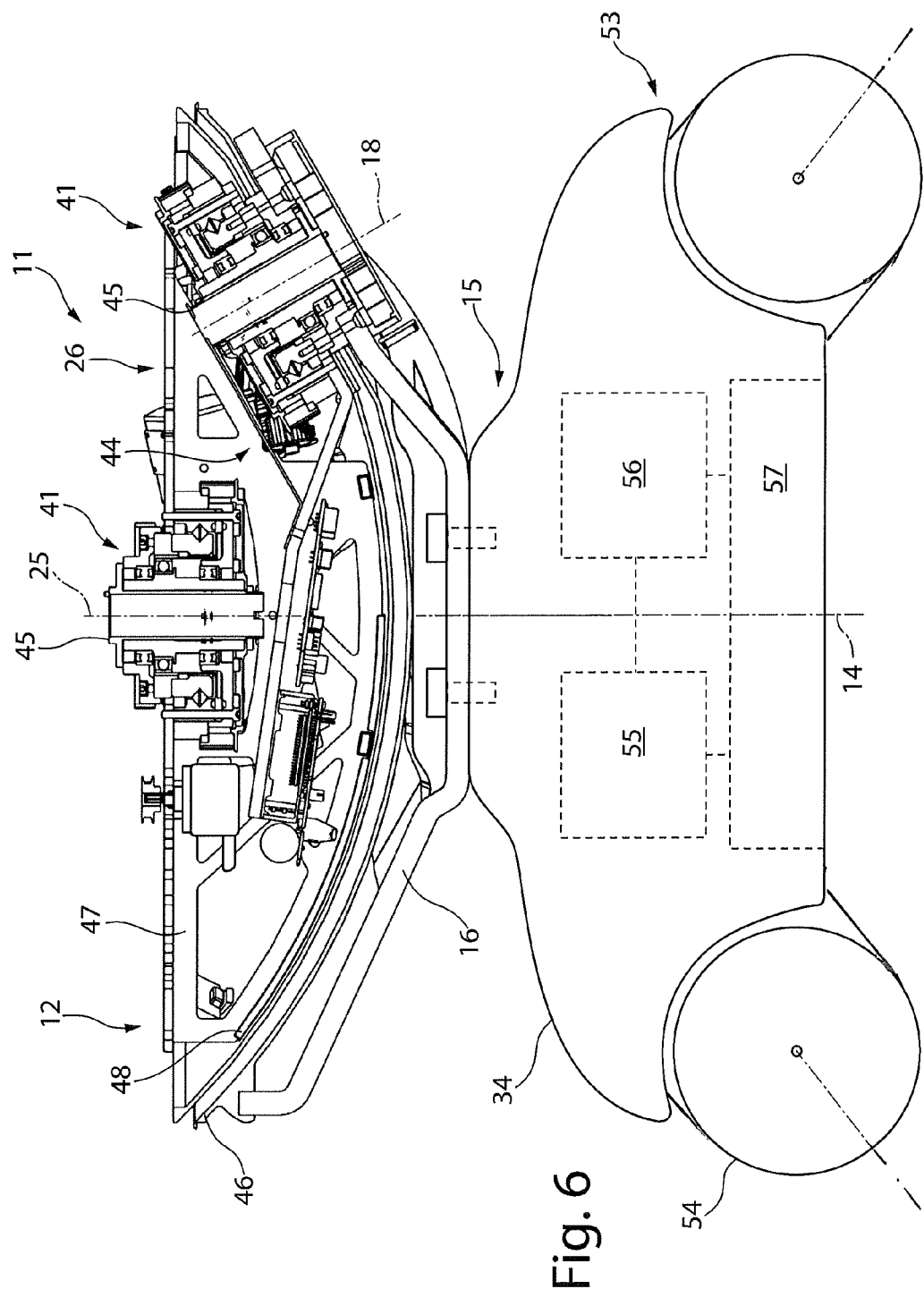

The invention, as well as further advantageous embodiments and further developments of the same are subsequently described and explained in more detail with reference to the examples depicted in the drawings. The features to be gleaned from the description and the drawings can, according to the invention, be applied on their own or together in any combination. Here are shown:

FIG. 1 a schematic sectional view of an embodiment of the joint arrangement in a starting position, FIG. 2 a schematic arrangement of the joint arrangement according to the invention, FIG. 3 a schematic sectional view of the joint arrangement according to FIG. 1 in an inclining position, FIG. 4a a schematic view of a robot in a starting position, FIG. 4b a schematic sectional view of the robot according to FIG. 4a, FIG. 5a a perspective view of a schematically depicted robot in an inclining position, FIG. 5b a schematic sectional view of FIG. 5a, and FIG. 6 a schematic side view of an alternative embodiment to FIG. 1.

In FIG. 1, a schematic sectional view of an embodiment of a joint arrangement 11 in a starting position 12 or zero position is depicted. FIG. 3 shows the joint arrangement 11 in an inclining position. This joint arrangement 11 comprises a first rotation axis 14 which is arranged fixedly on a first base element 15. A first rotation element 16 is incorporated by this first rotation axis 14 to be able to swivel about the first rotation axis 14 relative to the base element 15.

The first rotation element 16 incorporates a second rotation axis 18. This is arranged relative to the first rotation axis 14 having an axial offset 19 (FIG. 2) relative to the first rotation axis 14 and is inclined at an inclination angle 21 with respect to the first rotation axis 14. A second rotation element 22 is arranged for rotation about the second rotation axis 18, said rotation element in turn incorporating a third rotation axis 25 with a further axial offset 24, about which a second base element 26 is arranged for rotation. The further axial offset 24 advantageously corresponds to the first axial offset 19, and the first inclination angle 21 between the first and second rotation axis 14, 18 advantageously corresponds to the second inclination angle 21 between the second and third rotation axes 18, 25 such that the third rotation axis 25 is aligned collinearly to the first rotation axis 14.

A bearing 41 is provided on the base element 15 to form the first rotation axis 14, said bearing being fixed to a mounting plate 42 and preferably enclosed by a housing 43. This bearing 41 incorporates a hollow axis 45 for rotation, to which the first rotation element 16 is fixed. The hollow axis 45 is driven rotatably by a motor which is not depicted in further detail. This first rotation element 16 can be formed as a bearing structure which is formed as a curve and, in particular, has a pan-like or parabolic reflector-like shape. The bearing structure is preferably formed of a stiff and high-strength material. This rotation element 16 can incorporate a pan body 46 having a closed surface such that the underlying bearing structure of the first rotation element 16 is protected. The second rotation axis 18 is formed on the first rotation element 16, said rotation axis corresponding to the first rotation axis 14 in construction. The hollow axis 45 is arranged fixedly on the first rotation element 16 such that the bearing 41 rotates the second rotation element 22 for rotation about the second rotation axis 18. A motor 44 is provided in turn for rotatable drive to control the rotation of the second rotation element 22 relative to the first rotation element 16, independent of the further rotation movements to be activated. The second rotation element 22 has a bearing structure 47 which incorporates a cover or a sphere segment body 48 on the underside, which is formed complementary to the pan body 46. Thus, the pan body 46 and the sphere segment body 48 are spaced apart from each other in such a way that a clearance between them can be kept small in order to prevent clamping or the danger of crushing of limbs during swivelling movements of the second rotation element 22 relative to the first rotation element 16 and thus ensuring constructive safety. In addition, a small assembly space can thus also be created in the entire construction of such a joint arrangement. In turn, a bearing 41, as well as a motor 44, is arranged fixedly on the second rotation element 22 to form the third rotation axis 25 in order to rotatably drive the hollow axis 45, on which a mounting plate 42 of the second base element 26 is arranged.

The hollow axes 45 serve to lead through supply lines that are not depicted in more detail for activating the individual motors 44. Provided that, for example, the first base element 15 is fixed to a plinth of a robot, in which an energy supply and control is provided, the supply line can be led from there via the hollow axes 45 of the first rotation axis to the motor 44 of the second rotation axis 18, as well as through the hollow axis 45 of the second rotation axis 18 to the motor 44 for activating the rotation movement of the base element 25 about the third rotation axis 25. In addition, supply lines can be led through the hollow axis 45 of the third rotation axis 25 in order to supply further components, movement drives, control and/or calculator units as well as operating elements fixed to the second base element 26. The same applies in the opposite direction, starting from the second base element 26 to the first base element 15.

A cable reel is preferably provided on one of the two ends of the hollow axis 45, said cable reel being formed as storage and enabling an automatic winding and unwinding of supply lines depending on the activated rotation movement of the rotation elements 16, 22 or base elements 15, 26.

FIG. 2 shows a kinematic schematic diagram of the joint arrangement 11 according to FIG. 1, in order to illustrate the arrangement of the rotation axes 14, 18, 25 and the axial offsets 19, 24 as well as the inclination angle 21 of the rotation axis 18 relative to the rotation axis 14 or the rotation axis 25 relative to the rotation axis 18. For example, the first rotation axis 14 is depicted as being aligned vertically. The second rotation axis 18 is inclined relative to the first rotation axis 14 about an inclination angle 21 of 30° for example. At the same time, the second rotation axis 18 is spaced at the axial offset 19 relative to the first rotation axis 14. When the first rotation element 16 rotates about the first rotation axis 14, the second rotation axis 18 intersects the first rotation axis 14 at the intersection point 29. This intersection point 29 preferably depicts a sphere centre point of the pan body 46 formed as the first rotation element 16. The third rotation axis 25 is arranged in a starting position congruent with the first rotation axis 14, since the axial offset 24 between the second and third rotation axis 18, 25 corresponds to the axial offset between the first and second rotation axis 14, 18. During a rotation movement of the second rotation axis 18, the third rotation axis 25 rotates about the second rotation axis 18, wherein the third rotation axis 25 also always crosses the intersection point 29. A maximum inclining position 31 can thereby be achieved, which is depicted in FIG. 3 or FIG. 5b for example. The axial offset 19 between the first and second rotation axes 14, 18 as well as the axial offset 24 between the second rotation axis 18 and the third rotation axis 25 are thus effectively added up such that the third rotation axis 25 determines the maximum inclination relative to the vertically aligned first rotation axis 14, for example.

Based on the maximum inclination angle, the inclination angle 21 between the first and second rotation axis 14, 18 is determined by halving the maximum inclination angle 21 and thus the rotation axes 14, 18 and 25 are aligned with each other.

In the inclining position depicted in FIG. 3, the second rotation element 22 is depicted in a maximally lowered position in comparison to the first rotation element 16, which is able to be rotated by 360° via the first rotation element 16. Thus, a work space for the joint device 11 is formed. The intersection point 29 of the rotation axes 14, 18 and/or 25 lies outside this work space. The intersection point 29 preferably lies within a hypothetical space 49, i.e. a projected, cylindrical space which arises through the external periphery of the rotation element 16, in particular the pan body 46, and lies above the first rotation element 16 and outside the work space of the joint arrangement. Thus, a stable position is achieved even, for example, when the superstructure 35 occupies an inclining position.

In FIG. 4a, a schematic arrangement of a robot 33 is depicted which has a mobile platform 34 having a movable superstructure 35 which can be moved with respect to this, the centre of gravity 51 of which is depicted. Handling elements, such as, for example, arms or further, required components and/or sensors and/or operating elements for controlling, such as a touch screen for example, are not depicted to preserve clarity. In FIG. 4b, a schematic sectional view is depicted from which the alignment of the joint arrangement 11 arises. This is for example—as depicted in FIG. 1—assembled, i.e. the base element 15 is fixed to the mobile platform 34.

The base element 15 can, for example, be a base plate and a connecting flange which is able to be fixed to a plinth of a robot. Opposing it, the second base element 26 can be provided as a plate, sheet or connecting flange in order to support a superstructure 35 of a robot 33.

Alternatively, such a joint arrangement 11 can also be used for a shoulder, arm, knee, hand or neck joint. Depending on the movement to be activated, the alignment of the joint arrangement takes place between the two components to be connected.

In FIGS. 5a and 5b, such a robot 33 is depicted in a maximum inclining position 31. FIG. 5b shows the arrangement of the rotation axes 14, 18 and 25 which intersect at the intersection point 29. From this it becomes clear that, because of the axial offset 19 between the first and second rotation axes 14, 18, a centre of gravity shift by the degree of the axial offset 19 with respect to the first rotation axis 14 takes place. The centre of gravity 51 lies in the intersection point 29 for example. Thus an increased stability on the one hand and an enlarged inclination angle on the hand is made possible. Alternatively, the centre of gravity 51 cannot be congruent to the intersection point 29. In such a case, the centre of gravity 51 moves next to the intersection point 29 about the axis 14, wherein, however, there is also an increased stability because of the intersection point 29 within the workspace 49.

The joint arrangement 11 enables an analogue movement of a spherical joint, however this joint arrangement 11 requires a smaller assembly space. In addition, a centre of gravity shift when occupying an inclining position can be achieved to increase the stability and to enlarge the work region. Moreover, such an arrangement requires, on the one hand, a small assembly space and, on the other hand, enables a large work space.

In FIG. 6 a schematic view of an alternative embodiment of the joint arrangement 11 to FIG. 1 is depicted. The base element 15 is formed as a mobile platform 34, wherein the first rotation element 16 is fixed non-rotatably to the mobile platform 34. The first rotation element 16 can be connected to a connecting surface of the mobile platform 34 for example by a detachable connection, in particular a screw connection. The rotatable arrangement of the rotation element 16 relative to the base element 15 according to FIG. 1 can be omitted in this embodiment. Instead, the mobile platform 34 comprises a chassis 53 having wheels 54 or the like, whereby the mobile platform 34 can be driven for rotation about its own central axis such that the central axis of the mobile platform 34 forms the first rotation axis 14 of the first rotation element 16. The mobile platform additionally comprises at least one motor 56 for driving the chassis 53 or the wheels 54. In addition, a control 55 and a data processing device 55 is provided in order to activate the mobile platform 34 and/or the joint arrangement 11. Additionally, accumulators 57 can be provided in the mobile platform 34 which serves to drive the mobile platform 34 and/or the motors of the joint arrangement 11.

The invention claimed is:

1. A joint arrangement comprising:
   a first base element;

a first rotation element, wherein the first rotation element is rotatably driven about a first rotation axis of the first base element, and wherein the first rotation element is formed as a pan body, a second rotation element that is rotatably driven on the first rotation element about a second rotation axis that is angularly disposed with respect to the first rotation axis, wherein the second rotation element is formed as a spherical segment body that is spaced from the first rotation element such that a clearance gap is formed between the first rotation element and the second rotation element, a second base element that is rotatably driven with respect to the second rotation element about a third rotation axis that is angularly disposed with respect to the second rotation axis, and a first motor that drivingly connects the second rotation element to the first rotation element for driving the second rotation element about the second rotation axis relative to the first rotation element;

wherein the first and the second rotation axes intersect at an intersection point that is disposed outside of each movement path of the first rotation element, the second rotation element and the second base element.

2. The joint arrangement according to claim 1, wherein the second rotation element is rotatably driven about a portion of the second rotation axis that is offset laterally from the third rotation axis a first distance that is smaller than a second distance the portion is offset laterally from the first rotation axis.

3. The joint arrangement according to claim 2, wherein an inclination angle between the first rotation axis and the second rotation axis is the same as an inclination angle of the second rotation axis relative to the third rotation axis.

4. The joint arrangement according to claim 1, wherein the second rotation element is rotatably driven about a portion of the second rotation axis that is offset laterally from the third rotation axis a first distance that is equal to a second distance that the portion is offset laterally from the first rotation axis.

5. The joint arrangement according to claim 4, wherein an inclination angle between the first rotation axis and the second rotation axis is the same as an inclination angle of the second rotation axis relative to the third rotation axis.

6. The joint arrangement according to claim 1, wherein each of the first rotation element and the second base element is driven by a separate motor different from the first motor.

7. The joint arrangement according to claim 1, wherein, each of the first rotation element, the second rotation element and the second base element are rotatably driven about the corresponding rotation axis from a zero position to about an angle of plus or minus 360 degrees or less.

8. The joint arrangement according to claim 1, wherein a respective rotation position of the rotation elements and of the at least one base element are recorded by a sensor.

9. The joint arrangement according to claim 8, wherein the sensor is an absolute value transmitter.

10. The joint arrangement according to claim 1, wherein the first base element and the second base element are formed as a base plate or connecting flange.

11. The joint arrangement according to claim 1, wherein the rotation axes are each coaxial with a respective passage for a supply line.

12. The joint arrangement according to claim 1 in combination with a superstructure, wherein the superstructure is arranged on the second base element and a center of gravity of the superstructure lies in the intersection point of the first and second rotation axes.

13. The joint arrangement according to claim 1, wherein the first base element is formed as a mounting plate and comprises a second motor which drives the first rotation element, and the first rotation element is mounted for rotation by a bearing relative to the mounting plate.

14. The joint arrangement according to claim 1, wherein the first base element is formed as a mobile platform on which the first rotation element is fixedly arranged.

15. The joint arrangement according to claim 14, wherein the mobile platform has at least one chassis which is drivable to be moved by another motor and has accumulators for the first motor that drives the second rotation element about the second rotation axis, for other motors that drive the first rotation element and the second base element about the corresponding rotation axis and for the motor of the chassis.

16. A robot including:
the joint arrangement according to claim 1; and
a component coupled to the joint arrangement such that the joint arrangement moves the component of the robot.

17. The joint arrangement according to claim 1, wherein the second rotation element is rotatably driven relative to the first rotation element independent of rotation of the first rotation element and second base element.

18. The joint arrangement according to claim 1, wherein the second rotation element is rotatably driven about a portion of the second rotation axis that is offset laterally from the third rotation axis a first distance that is larger than a second distance the portion is offset laterally from the first rotation axis.

19. A joint arrangement comprising:
a first base element;
a first rotation element, wherein the first rotation element is rotatably driven about a first rotation axis of the first base element, and wherein the first rotation element is formed as a pan body,
a second rotation element that is rotatably driven on the first rotation element about a second rotation axis that is angularly disposed with respect to the first rotation axis, wherein the second rotation element is formed as a spherical segment body that is spaced from the first rotation element such that a clearance gap is formed between the first rotation element and the second rotation element, and
a second base element that is rotatably driven with respect to the second rotation element about a third rotation axis that is angularly disposed with respect to the second rotation axis,
wherein the first and the second rotation axes intersect at an intersection point that is disposed outside of each movement path of the first rotation element, the second rotation element and the second base element, and
wherein the second rotation axis is inclined with respect to the first rotation axis by a first acute angle, and the third rotation axis is inclined with respect to the second rotation axis by a second acute angle.

20. The joint arrangement according to claim 19, wherein in a first state of the joint arrangement, the first rotation axis and the third rotation axis are coaxial and the second rotation axis is inclined relative to the first rotation axis by the first acute angle, and
wherein in a second state of the joint arrangement, the third rotation axis is inclined relative to the first rotation axis, the third rotation axis is inclined relative to the second rotation axis by the second acute angle and the second rotation axis is inclined relative to the first rotation axis by the first acute angle.

\* \* \* \* \*